US009151069B2

(12) United States Patent
Bobbio

(10) Patent No.: US 9,151,069 B2
(45) Date of Patent: Oct. 6, 2015

(54) SPOOL-MOUNTED COILED STRUCTURAL EXTENDING MEMBER

(71) Applicant: Stephen M. Bobbio, Wake Forest, NC (US)

(72) Inventor: Stephen M. Bobbio, Wake Forest, NC (US)

( * ) Notice: Subject to any disclaimer, the term of this patent is extended or adjusted under 35 U.S.C. 154(b) by 0 days.

(21) Appl. No.: 13/861,679

(22) Filed: Apr. 12, 2013

(65) Prior Publication Data

US 2014/0123575 A1  May 8, 2014

Related U.S. Application Data

(60) Provisional application No. 61/637,123, filed on Apr. 23, 2012.

(51) Int. Cl.
*E04H 12/18* (2006.01)
*B25J 9/10* (2006.01)
*B25J 18/02* (2006.01)
*F16H 19/06* (2006.01)

(52) U.S. Cl.
CPC ............... *E04H 12/185* (2013.01); *B25J 9/104* (2013.01); *B25J 18/02* (2013.01); *F16H 19/064* (2013.01)

(58) Field of Classification Search
CPC ......... E04H 12/185; B25J 9/104; B25J 18/02; F16H 19/064
USPC .............. 52/108, 109; 242/379, 379.2, 388.6, 242/390.2, 397, 397.5, 400, 594, 594.1, 242/594.2, 595, 595.1
See application file for complete search history.

(56) References Cited

U.S. PATENT DOCUMENTS

| 609,491 | A | * | 8/1898 | Ashwell | 5/99.1 |
| 1,636,754 | A | * | 7/1927 | O'Sullivan | 33/3 C |
| 1,729,955 | A | * | 10/1929 | Matthaei | 242/595.1 |
| 1,947,392 | A | * | 2/1934 | Guntermann et al. | 52/108 |
| 2,299,687 | A | * | 10/1942 | Farrand | 52/108 |
| 2,553,703 | A | * | 5/1951 | Ebersole | 5/99.1 |
| 2,574,610 | A | * | 11/1951 | Aarestad | 5/99.1 |
| 3,242,576 | A | * | 3/1966 | Wheeler | 33/293 |
| 3,443,316 | A | * | 5/1969 | Edgell | 33/767 |
| 3,497,927 | A | * | 3/1970 | Norton | 28/194 |
| 3,508,587 | A | * | 4/1970 | Mauch | 138/119 |
| 3,638,360 | A | * | 2/1972 | Vaa | 49/248 |
| 3,654,982 | A | * | 4/1972 | Labelle | 160/199 |
| 4,221,020 | A | * | 9/1980 | Wertepny | 16/96 D |
| 4,275,503 | A | * | 6/1981 | Bergkvist | 33/757 |
| 4,387,875 | A | * | 6/1983 | Ohori | 248/480 |
| 4,455,948 | A | * | 6/1984 | Torres | 108/44 |
| 4,473,916 | A | * | 10/1984 | Connold | 14/42 |
| 4,625,475 | A | * | 12/1986 | McGinnis | 52/108 |
| 4,635,729 | A | * | 1/1987 | Harmathy | 169/48 |
| 4,844,109 | A | * | 7/1989 | Navarro | 135/129 |
| 5,056,276 | A | * | 10/1991 | Nielsen et al. | 52/12 |
| 5,056,278 | A | * | 10/1991 | Atsukawa | 52/108 |
| 5,063,686 | A | * | 11/1991 | Peloquin | 33/757 |
| 5,088,542 | A | * | 2/1992 | Biba et al. | 160/168.1 R |
| 5,131,955 | A | * | 7/1992 | Stern et al. | 136/245 |
| 5,290,050 | A | * | 3/1994 | Kim | 280/42 |
| 5,328,124 | A | * | 7/1994 | Tsuchiya et al. | 242/337 |
| 5,718,087 | A | * | 2/1998 | Featherstone et al. | 52/121 |
| 5,961,738 | A | * | 10/1999 | Benton et al. | 136/245 |
| 6,217,975 | B1 | * | 4/2001 | Daton-Lovett | 428/105 |
| 6,325,132 | B1 | * | 12/2001 | Anderson et al. | 160/173 V |

(Continued)

*Primary Examiner* — James Ference

(57) ABSTRACT

Structural extending members comprising single-tape and composite-tape structures and the means for forming them. Includes tapes with cross sections containing both concave and convex sides facing in the same direction.

1 Claim, 5 Drawing Sheets

(56) References Cited

U.S. PATENT DOCUMENTS

| | | | |
|---|---|---|---|
| 7,891,145 B1* | 2/2011 | Bobbio | 52/108 |
| 2002/0032992 A1* | 3/2002 | Roth et al. | 52/109 |
| 2004/0244213 A1* | 12/2004 | Burrell et al. | 33/558.02 |
| 2006/0101731 A1* | 5/2006 | Hanson et al. | 52/109 |
| 2010/0242659 A1* | 9/2010 | Saito | 74/490.04 |

* cited by examiner

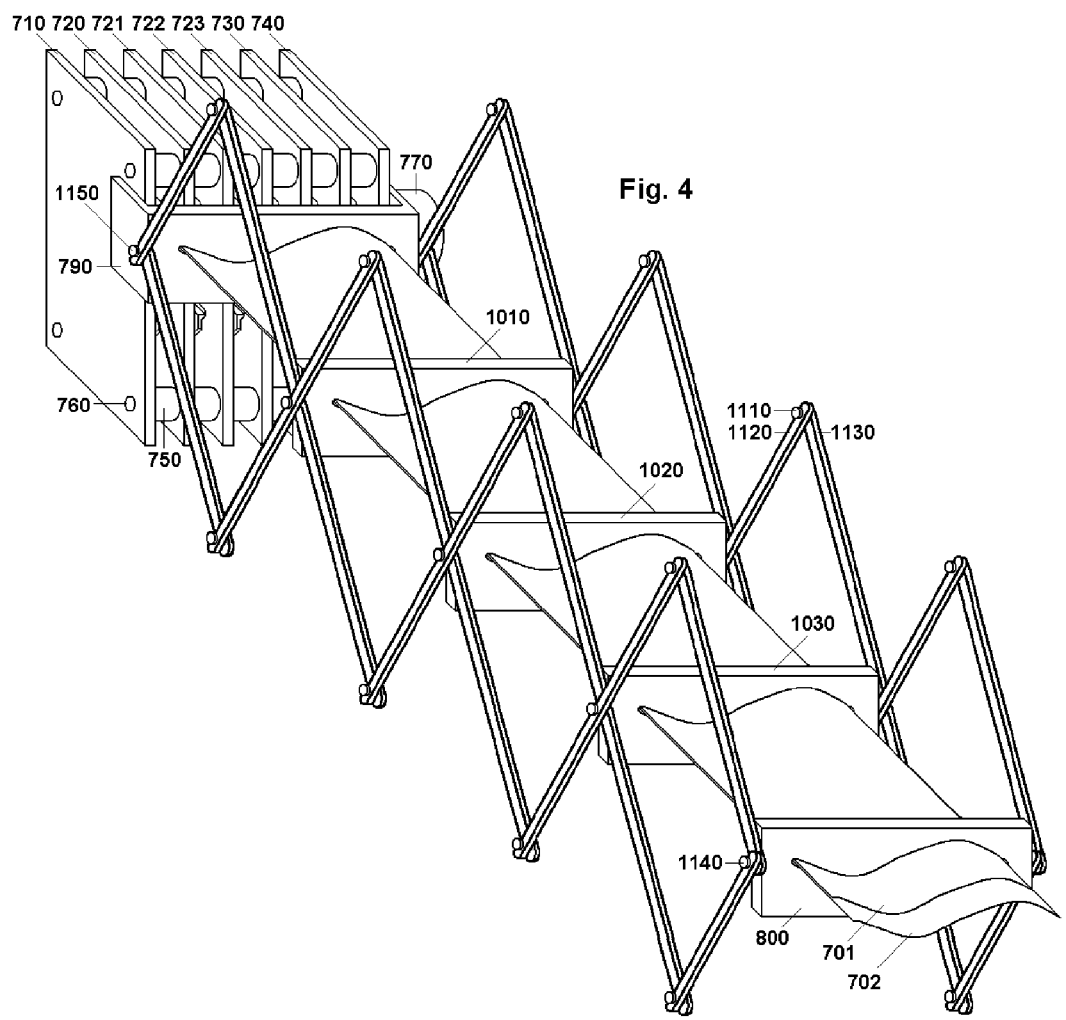

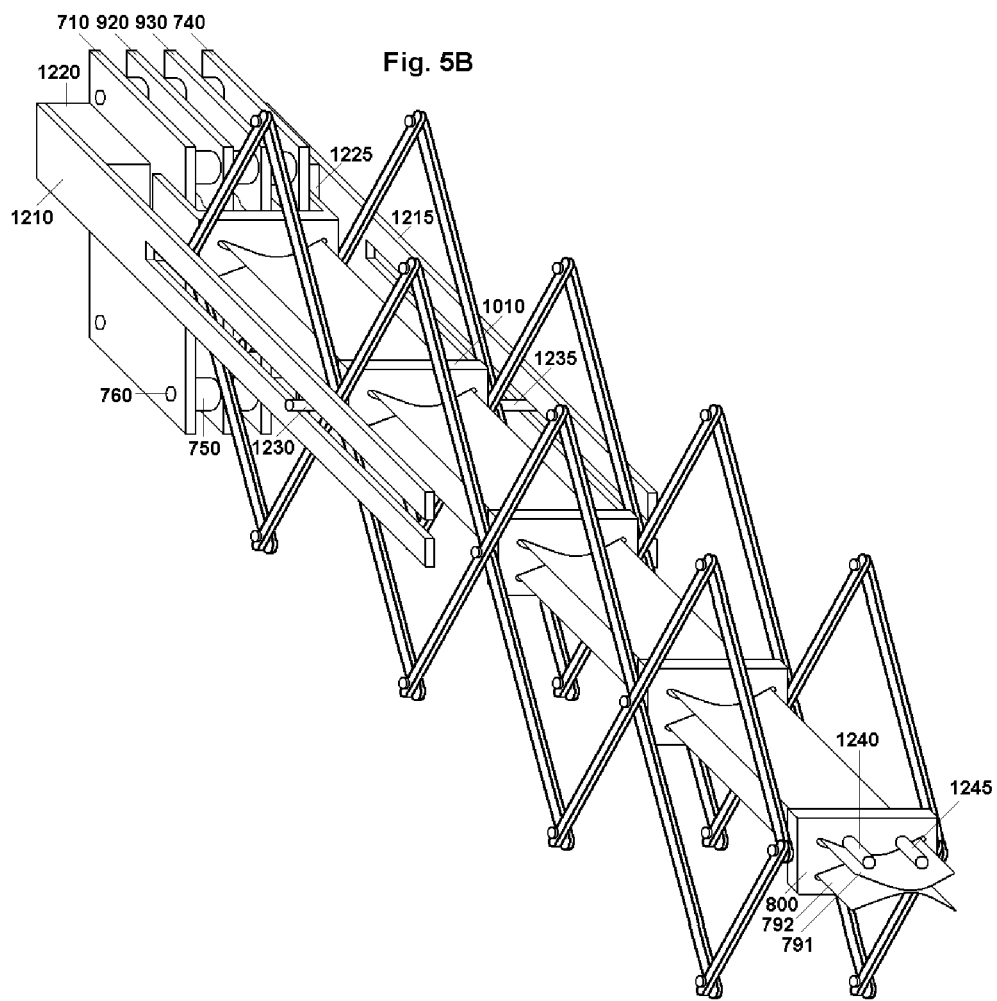

SPOOL-MOUNTED COILED STRUCTURAL EXTENDING MEMBER

This application claims benefit of U.S. Provisional Application 61/637,123, filed on Apr. 23, 2012.

BACKGROUND

In many circumstances it would be useful to form a relatively long rigid member from a compact source at one end. For example a robotic arm that can transfer parts through vacuum doors in a multiple chamber vacuum system has proven important in the design of the cluster tools used in the integrated circuit manufacturing industry. In the past such devices have used lead screws, pneumatic or hydraulic cylinders, or pantograph type mechanisms to effect their operation. Robotic extension arms are also useful additions to autonomous or remotely controlled robots in a wide range of applications from those used in planetary exploration to those involved in munitions detection and passivation.

Structural extending members comprising three flexible tapes have been described in U.S. Pat. Nos. 4,625,475; 3,242,576; and 5,056,278. In U.S. Pat. No. 3,242,576, Wheeler describes a rigid extendable measurement device in which three flexible metal tapes are held together at their edges by means of hook-and-loop material to form a rigid structure with a triangular cross section. In U.S. Pat. No. 4,625,475, McGinnis describes an extensible mast, which is erected from a portable base. The mast comprises a plurality of tapes reinforced with a wrap material. In U.S. Pat. No. 5,056,278, Atsukawa describes an extensible pole in which telescoping cylindrical bodies are extended and retracted by means of band-like plates. The band-like plates are held in place within the cylindrical bodies by partition members having guide slits or guide holes to accommodate the band-like plates. None of these disclosures describe retaining rings that are carried on an extendible structure comprising a plurality of tapes. Most relevant to this disclosure, in U.S. Pat. No. 7,891,145, Bobbio describes a number of designs of compound tapes and spooling mechanisms for use as motion effecting elements in robotic systems.

SUMMARY OF THE INVENTION

U.S. Pat. No. 7,891,145 discloses a lightweight long range extending member formed from assembled tapes such as those used in retractable metal measuring tapes which are widely available in a range of lengths (25 ft typical) and widths (1 inch typical). These tapes are wound about a spring loaded spindle that allows for easy retraction. The cross section of the tapes is curved to lend some rigidity during extension. This rigidity is not uniform. Forces that act toward the convex side of the curve easily kink the tape although the tape is much more resistant to forces acting toward the concave side. A typical tape with its concave side facing upwards can be extended horizontally about seven feet before it collapses under its own weight. A tape with its convex side facing up collapses for much less extension. For widths greater than those available with measuring tapes, spring steel is readily available in much larger sizes though it is usually flat. The methods and structures described herein also apply to larger tapes as well as to those with flat cross sections.

The strength of an extended structure can be greatly increased by forming a composite structure from individual single tapes. This invention describes various composite structures and the means for forming them. In this disclosure the structures and methods described in U.S. Pat. No. 7,891,145 are extended to include tapes whose cross sections contain both concave and convex sides facing in the same direction and which are thus inherently stronger than those described earlier. Because of the enhanced strength such tapes may be used singly as well as in composites with more than one tape.

BRIEF DESCRIPTION OF THE DRAWINGS

FIG. 4 is an isometric view of the two-tape structure in FIG. 1B where a pantograph mechanism has been used to distribute retaining parts at intervals along the length of the extended tapes.

FIG. 5B is an isometric view of the structure shown in FIG. 5A with the addition of lateral guides and a termination that facilitates attachment to one of the extended tapes.

DETAILED DESCRIPTION OF THE PREFERRED EMBODIMENTS

Figure 1A:
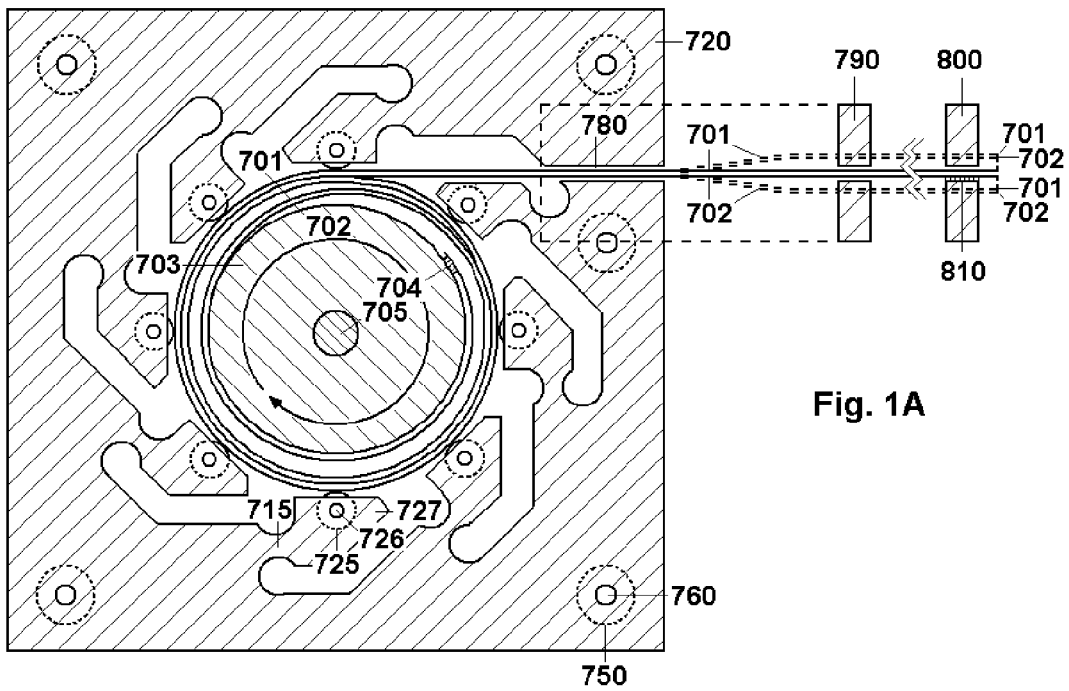
FIG. 1A shows a plan view of a two-tape embodiment of a composite structure whose cross section is corrugated according to the present invention and a mechanism for forming the structure. The drawing shows two tapes but since the cross section of either tape contains both concave and convex regions a single tape may also be used.
Figure 1B:
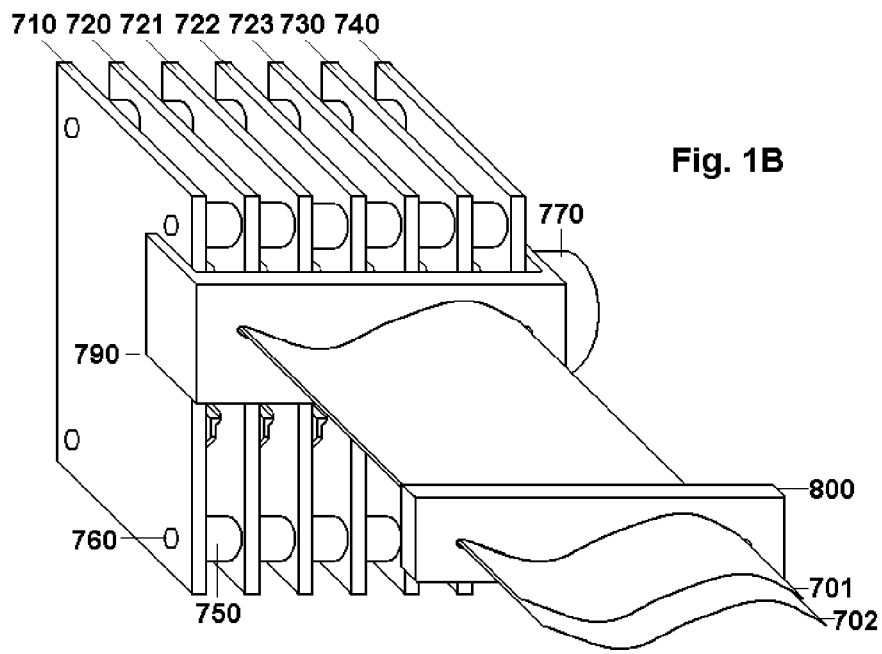
FIG. 1B is an isometric view of a two-tape structure in FIG. 1A.

FIG. 1 shows a first embodiment of this invention. In the mechanism of FIG. 1 two tapes are simultaneously extended or retracted from the same spool by forces that act in the circumferential direction upon the interior ends of the tapes. The tapes in FIG. 1 have a corrugated cross section and thus contain both convex and concave portions facing in the same direction and could also be used in a single tape structure. The tapes are joined together outside the spooling structure to form a mechanically robust extending structure. FIG. 1A shows a plan view of the interior of mechanism and FIG. 1B an overall perspective view. In FIG. 1A two metal tapes, 701 and 702, are wound, overlapping each other, on a spool piece, 703. The tapes are rigidly fixed to each other and to the periphery of the spool piece using fasteners like small machine screws or a strong adhesive at 704 in the figure. The spool piece, 703, is fastened to an axle, 705, that is also connected to some mechanical means (e.g. a motor or hand crank) that can impart rotary motion to the spool piece. Clockwise motion of the spool, 703, that results in extension of the composite structure is illustrated by a circular arrow in FIG. 1A. The support structure is composed of seven plates (710, 720, 721, 722, 723, 730, and 740 in FIG. 1B) of a low friction plastic material such as UHMW polyethylene, fluorinated ethylene propylene (FEP), or polytetrafluoroethylene (PTFE). The plates are separated by spacers and held together with fasteners (e.g. machine screws and nuts) through the plates and the centers of the spacers. In FIG. 1 a typical spacer is shown at 750 and a typical fastener is shown at 760. All of the plates of the support structure are not the same. Plate 710 simply serves as a low friction retainer for the tapes to bear upon. Plate 740 serves the same purpose as plate 710 but also serves as a mounting plate for the mechanical means that effects the rotary spooling motion. In FIG. 1B the mechanical means is an electric motor, 770, mounted to plate 740. Plates 720, 721, 722, 723, and 730 are identical and, in addition to being a part of the support structure, also serve as segmented versions of a low friction compressible layer. The low friction layer is composed of rollers, 725, that rotate on axles, 726, supported in frame pieces, 727. The frame pieces in FIG. 1 are an integral part of the plates 720, 721, 722, 723, and 730. The frame pieces are connected to the rest of the plates, 720, 721, 722, 723, and 730 by narrow regions, such as 715 in FIG. 1A, that act as springs and allow the frame pieces and rollers to move in order to accommodate the changing diameter of the coiled tapes, 701 and 702, as they wind or unwind on the spool piece, 703.

In many cases (e.g. small spooling structures and light external loading) the axles, 726, and rollers, 725, may be replaced by simple spacers that join plates 720, 721, 722, 723, and 730 together at the frame pieces, 727. These frame pieces then contact the tape, 701, directly and, if they are made of a low friction material, may provide enough friction reduction to eliminate the need of a roller. Similarly, if the tapes are not excessively long and are not heavily loaded in the axial direction toward the spool, rigid roller support plates may be substituted for the compliant plates 720, 721, 722, 723, and 730 in FIG. 1B. The two tapes, 701 and 702, enter or exit the spooling structure though a slot, 780, in plates 720, 721, 722, 723, and 730. If the tapes are of the type used as measuring tapes (thin spring steel) they may be preformed to have a corrugated cross section and will naturally bend into the corrugated cross sectional shapes outside the spooling structure and the cross sections will flatten as they are wound around the spool, 703. The cross sectional corrugation is shown clearly in the isometric view in FIG. 1B.

The support piece, 790, is attached to plates 710 and 740 and the composite extending structure (formed from tapes 701 and 702) passes through it. The support piece in FIG. 1 is made of a low friction material (e.g. UHMW polyethylene, fluorinated ethylene propylene (FEP), or polytetrafluoroethylene (PTFE)) that does not impede the passage of tapes 701 and 702. The two tapes that form the composite structure in FIG. 1 are joined together at the end of the extension using a joining piece, 800. Because the tapes are rigidly joined at the point labeled 704 in FIG. 1A they cannot both be rigidly joined to the joining piece. Each turn of tape 701 on the spool, 703, is at a larger circumference than the corresponding turn of tape 702. For a given number of clockwise rotations of the spool, 703, the left end of tape 701 will move further than the left end of tape 702. Thus the joining piece is made of a low friction material, such as UHMW polyethylene, fluorinated ethylene propylene (FEP), or polytetrafluoroethylene (PTFE), that allows tape 701 to slide easily through it while tape 702 is rigidly attached to the joining piece using fasteners like small machine screws or a strong adhesive at 810 in FIG. 1A. Mechanical attachment of an external system to the composite structure may be accomplished by means of a rigid coupling of that system to the joining piece, 800. If only a single tape is wound around about the spool piece, 703 in FIG. 1A the joining piece, 800 would not be required.

Figure 3:
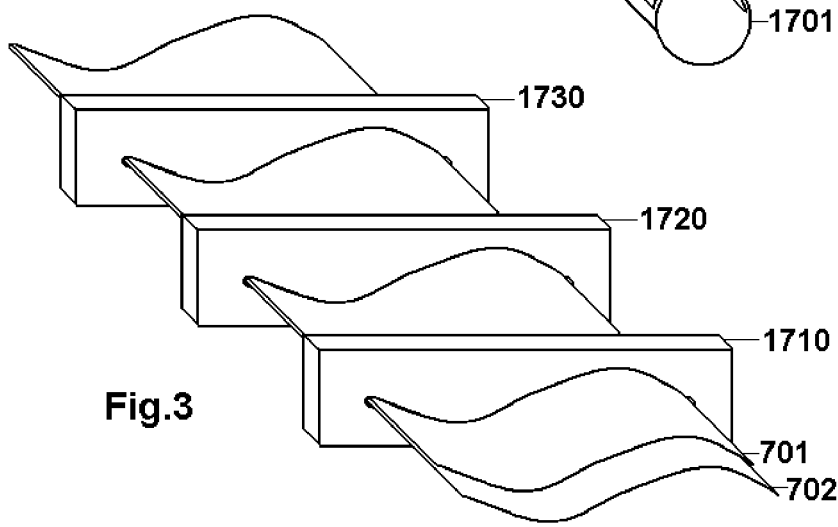
FIG. 3 is an isometric view of a composite extending member with retaining pieces distributed at intervals along its length.

If tapes with preformed cross sections are unavailable, tapes that are inherently flat may also be used. Flat spring steel is readily available in a wide variety of thicknesses, widths, and lengths. In this case retaining parts (1710, 1720, and 1730 in FIG. 3) may be used to form and retain the corrugations in the extended tapes as well as to contribute to the assembly if more than one tape is used. The retaining pieces are formed of a low friction material and are provided with slots in the shape of the desired cross section (e.g. corrugations). The retaining parts are not rigidly fixed to any of the flexible tapes but are held in place by friction. They may be moved along the tapes and are positioned at intervals along their length. Three representative retaining parts (1710, 1720, and 1730) are shown in position in FIG. 3. One mechanism (a pantograph) for positioning retaining parts on extending tapes will be discussed in this disclosure. Other mechanisms have been proposed and discussed in U.S. Pat. No. 7,891,145.

Figure 2A:
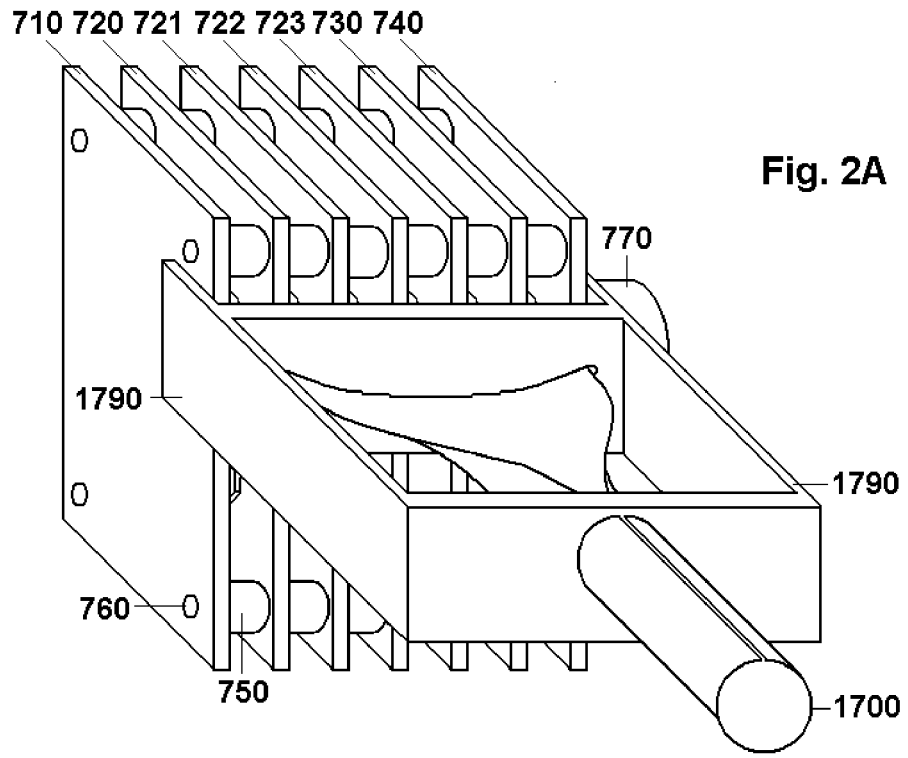
FIG. 2A shows an isometric view of a single tape first embodiment of an extending member whose cross section is circular according to the present invention and a mechanism for forming the structure. Again, the circular cross section contains both concave and convex regions.
Figure 2B:
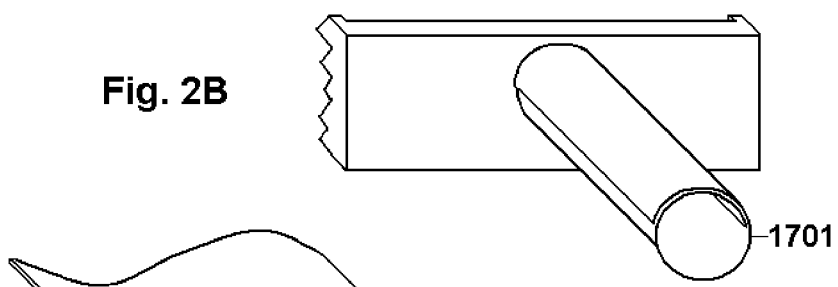
FIG. 2B shows an isometric view of the end of a second embodiment of an extending member whose cross section is circular.

FIG. 2 shows a second embodiment of the invention. In this case the extended cross section is circular and so also contains both convex and concave parts facing in the same direction. FIG. 2A shows an isometric view of a spooling structure that is identical to the structure shown in FIG. 1 except that the support piece, 1790, is lengthened to allow the substantial deformation required to form the circular cross section from one that is originally flat. Ideally, the cross section of tape, 1700, would be preformed to be a circle and it would flatten during spooling. On the contrary, if the relaxed shape of the cross section is flat, retaining pieces similar to the ones shown by 1710, 1720, and 1730 in FIG. 3, but with circular apertures, might be used. For the circular cross section shown in FIG. 2A, the included angle from one edge of the tape to the other is 360 degrees. A stronger structure is shown in FIG. 2B where the included angle is 540 degrees and the edges of the extended tape 1701 overlap. The additional strength is gained at the expense of a wider tape and larger deformation required in the transition from the spooled to the extended form. In a preferred embodiment the included angle is between 270 and 360 degrees, including the end points. In another preferred embodiment, the included angle is between 360 and 450 degrees, including the end points. In another preferred embodiment, the included angle is between 450 and 540 degrees, endpoints included.

Figure 5A:
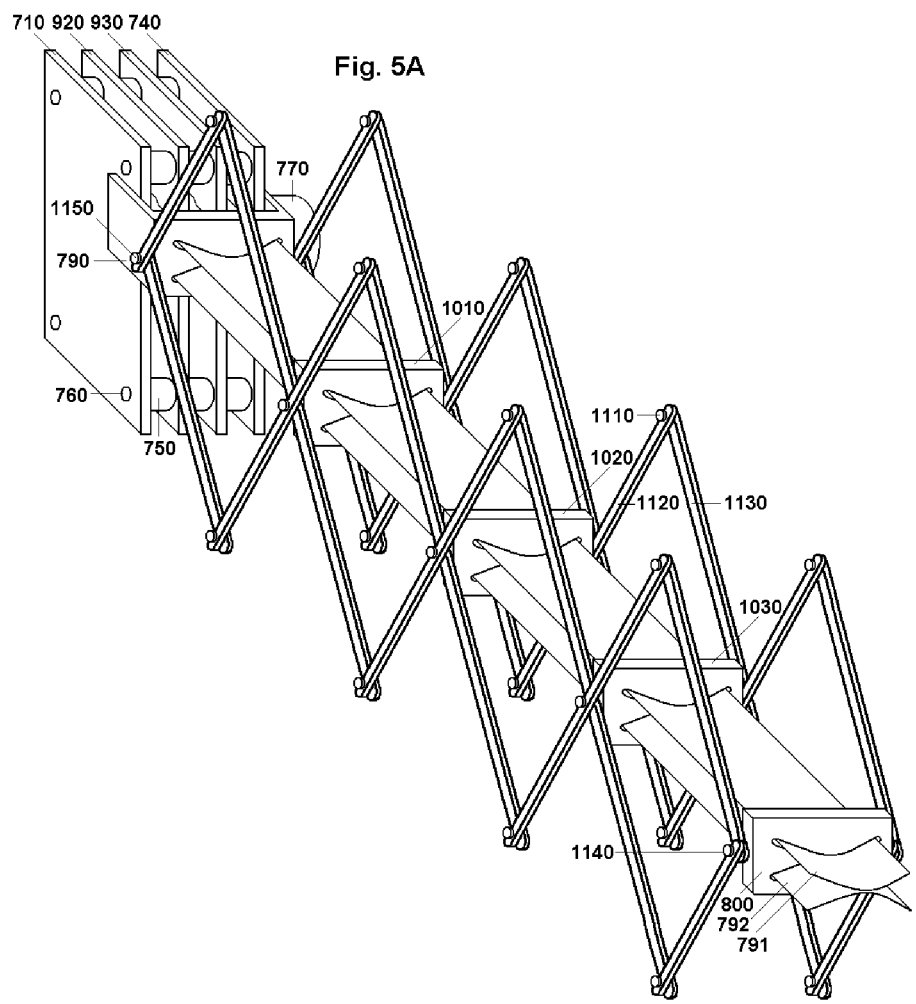
FIG. 5A is an isometric view of a two-tape structure disclosed in U.S. Pat. No. 7,891,145 where a pantograph mechanism has been used to distribute retaining parts at intervals along the length of the extended tapes.

FIG. 4 illustrates a pantograph mechanism for positioning retaining parts on the tape assembly shown in FIG. 1B. The mechanism is conventionally composed of bars such as those shown by 1120 and 1130 and pins such as the pin shown at 1110 in the figure. The pins join the bars together in such a way that they may smoothly rotate about the pins. The bars are also joined to low friction retaining pieces (at 1010, 1020, 1030, in the figure) by pins such as the one shown by 1140 in FIG. 4. Here again, the bars are free to rotate about the pins although the pins themselves are firmly anchored in the retaining pieces. One end of the pantograph is held to the frame of the extension mechanism by pins such as the one shown at 1150 in the figure. The other end of the pantograph is attached to the joining piece 800 which in turn is rigidly attached to one of the plurality of extending tapes such as the one shown by 701. The other tapes in the plurality, such as 702, are free to slide through the joining piece 800. All the tapes in the plurality are free to slide through the retaining pieces (1010, 1020, 1030). As the tapes extend, the joining piece 800 is pulled and this, in turn stretches the pantograph along the length of the extended tapes thereby distributing all the retaining pieces along the length. FIG. 5A shows the same pantograph mechanism applied to a spooled coiled actuator as described in U.S. Pat. No. 7,891,145 in which two tapes (one concave, 791, and the other convex, 792) are used to form the composite extended structure The composite extended structure consisting of one or a plurality of tapes, retaining pieces, and pantograph is significantly more rigid than either the pantograph or extended tapes separately. The separate pantograph flexes substantially and extends out in a bowed way, even when very lightly loaded. The separate tape composites are much less bowed but have a very low torsional spring constant for rotation around the axis of the extended tapes. The tape-pantograph composite ameliorates both issues. Although it should be mentioned that the low spring constant is sometimes an advantage. For example, in applications where the extended end is used to actuate something that has its own mechanical constraints, it allows the extended end to adapt to the constraints but still produce substantial force in the axial direction.

FIG. 5B shows the same actuator as 5A with some practical additions that improve operation and assembly. The actuator shown in FIG. 5B is the same as the one in FIG. 5A with the addition of two frame extension assemblies (1220, 1210 and 1225, 1215), two support elements (1230 and 1235) and two rigid attachment posts (1240 and 1245). The extension assemblies are rigid structures containing a slot. The pins attaching the pantograph to the retaining piece 1010 have been modified with the addition of low friction posts or cylindrical rollers (1230 and 1235) that bear in the slots and provide additional support for the extended composite. It is desirable that the surfaces of the support elements facing the pantograph be low friction. For example, the inner surfaces of aluminum support elements might be covered with thin strips UHMW polyethylene, fluorinated ethylene propylene (FEP), or polytetrafluoroethylene (PTFE). The joining piece (800) has been provided with two rigid posts (1240 and 1245) to which the upper tape in the composite (791) may be securely attached; for example by screw fasteners through tape 791 and into the posts.

What is claimed is:
1. A structural extending member comprising:
a support structure having a cavity adapted to support a coiled flexible tape, wherein the support structure comprises a first end plate, at least one interior plate, and a second end plate,
a spool piece contained within the cavity of the support structure,
a first flexible tape having a first end and a second end and a second flexible tape having a first end and a second end wherein the first end of the first flexible tape and the first end of the second flexible tape are attached to the spool piece,
a joining piece, wherein the second end of the first flexible tape is attached to the joining piece,
rotary mechanical means adapted to wind the first flexible tape and the second flexible tape onto the spool piece and unwind the first flexible tape and the second flexible tape to an extended form, each of the first and second tapes having a length and a width, wherein the length of each of the first and second tapes is a dimension in a direction along the extended form and the width of each of the first and second tapes is a dimension between longitudinal edges of the first and second tapes in a direction perpendicular to the length,
a plurality of retaining pieces distributed along the length of the first and second tapes in the extended form,
a pantograph mechanism, having a length and a width, adapted to distribute the retaining pieces along the length of the first and second tapes in the extended form, wherein the pantograph mechanism comprises a plurality of pairs of bars pinned together at midpoints of the bars and wherein the length of the pantograph is a dimension in the direction along the extended form and the width of the pantograph is a distance between ends of the bars in a direction perpendicular to the length of the pantograph mechanism, and wherein the width of the pantograph mechanism is perpendicular to the width of the first and second tapes in the extended form.

\* \* \* \* \*